United States Patent

Pruna

[11] Patent Number: 5,817,349
[45] Date of Patent: Oct. 6, 1998

[54] MARKER DEVICE INSERTABLE IN PLASTIC INJECTION MOLDS

[76] Inventor: Alberto Navarra Pruna, 8, calle Juan Ramon Jiménez, 08960 Sant Just Desvern, Spain

[21] Appl. No.: 732,385
[22] PCT Filed: Feb. 29, 1996
[86] PCT No.: PCT/ES96/00041
  § 371 Date: Oct. 17, 1996
  § 102(e) Date: Oct. 17, 1996
[87] PCT Pub. No.: WO96/27490
  PCT Pub. Date: Sep. 12, 1996

[30] Foreign Application Priority Data

Mar. 3, 1995 [ES] Spain ................................. 9500421

[51] Int. Cl.$^6$ .................................................. B29C 33/00
[52] U.S. Cl. ...................... 425/542; 249/53 R; 249/103; 249/104
[58] Field of Search ........................ 249/102, 103, 249/104, 53 R; 425/542

[56] References Cited

U.S. PATENT DOCUMENTS

| | | |
|---|---|---|
| 4,137,962 | 2/1979 | Pol . |
| 4,342,549 | 8/1982 | Lemelson . |
| 4,384,702 | 5/1983 | Boskovic .............................. 249/103 |
| 4,708,314 | 11/1987 | Kuhling ............................... 249/103 |
| 5,057,000 | 10/1991 | Mangone, Jr. ....................... 249/103 |
| 5,494,431 | 2/1996 | Tefler .................................. 249/103 |
| 5,620,716 | 4/1997 | Opitz .................................. 249/103 |

FOREIGN PATENT DOCUMENTS

| | | |
|---|---|---|
| 0372732A3 | 11/1989 | European Pat. Off. . |
| 2620370 | 9/1987 | France . |
| 2644610 | 3/1989 | France . |

*Primary Examiner*—Tim Heitbrink
*Attorney, Agent, or Firm*—Michael J. Striker

[57] ABSTRACT

A marker device insertable in a plastic injection mold, has a hollow body lockable in the mold so that an external surface of the hollow body is flush with an internal wall of the mold, the hollow body being provided with a cylindrical central orifice, a cylindrical head which is tightly placed in the cylindrical central orifice of the hollow body and extending toward an interior of the mold via an internal coaxial rod which pierces the hollow body and has an outer end provided with an external surface which is flush with the internal wall of the mold, the head being turnable on its own axis for varying its angular position with respect to the hollow body, and an actuator unit embedded in the wall of the mold connected to the internal rod of the head and commandable from outside of the mold by an external control unit, the actuator unit turning the head on an axis of the head in any of both rotation directions.

5 Claims, 4 Drawing Sheets

MARKER DEVICE INSERTABLE IN PLASTIC INJECTION MOLDS

TECHNICAL FIELD

The present invention relates to a marker device insertable in plastic injection molds, of the type which are comprised by a hollow body, which can be embedded in the mold in such a manner that its external surface is flush with the internal wall of the mold, the said hollow body being provided with a cylindrical, central orifice within whose interior a cylindrical head is tightly placed that extends towards the interior of the mold via an internal coaxial rod that pierces the hollow body and that on its outer end also presents an external surface flush with the internal wall of the mold, the said head being able to turn on its own axis with the aim of varying its angular position with respect to the hollow body.

STATE OF THE ART

Marker devices which can be inserted in plastic injection molds are well-known, principally useful to record date of manufacture and other similar details in pieces of injected plastic.

The date-markers for molds of thermoplastic material are basically composed of a hollow, cylindrical body, where the numbers of the months, weeks etc. are recorded, and of a central, cylindrical head in which is recorded the present year and an arrow whose point indicates the month, week, etc. in which the product was manufactured. In this manner, the date of manufacture of the product can always be known with exactitude.

The date-marker bodies of this type are embedded in the wall of the mold and their numbers are normally recorded in bas-relief, by which means they are reproduced in the injected piece in high-relief. The arrow always has a depth of impression greater than that of the numbers, which is necessary to allow the turning of the central head until the arrow indicates in each case the information which it is necessary to reproduce in the piece of plastic. Such a turn of the central head is realised by way of a conventional screwdriver or, in some cases, an Allen key.

The high-relief of the numbers in the plastic, principally that of the arrow, in many cases makes the flat placement of the piece of molded plastic difficult. At the same time, pieces of plastic for medical, pharmaceutical or alimentary use, and even those related with electronic instruments, introduce in the high-relief, recorded numbers, areas where grime is easily collected, which in many cases is not acceptable for the end use of the product.

Another problem stemming from conventional date-markers, consists in that in being placed in the cavity of the mold, their manipulation and positioning is, in many cases made difficult by the mold being in the injection machine and having difficult access, needing annoying manoeuvres to change the date and it sometimes being unavoidable to inject several pieces until the exact position of the arrow is found.

DESCRIPTION OF THE INVENTION

The marker device insertable in plastic injection molds which is the object of the present invention, eliminates all the said drawbacks and moreover provides multiple advantages that will be clear from the description of the invention.

In its essence the described device is characterised in that it is provided with actuator means embedded in the wall of the mold, connected to the internal rod of the head and susceptible of being commanded from the outside of the mold by way of external control means, said actuator means being adapted to make the head turn on its axis, in short turns of pre-determined angular values.

According to another feature of the invention, the actuator means is constituted by an electromotor, provided with a speed-reducer, and a position detector.

According to another feature of the invention, the actuator means comprises an electromotor of the "step-by-step" type.

According to another feature of the invention, the external control means is removably connected to the electromotor circuit of the actuator means, comprises a source of electric energy, is adapted to provide the electrical current for the running of the electromotor, and is provided with means for the programming of the start and stop of the electromotor.

Finally, and according to another feature of the invention, the head and the actuator means preferably constitute a single and inseparable block.

BRIEF DESCRIPTION OF THE DRAWINGS

In the attached drawings there are illustrated, by way of non-restrictive example, some embodiments of the device object of the invention.

Figure 1:
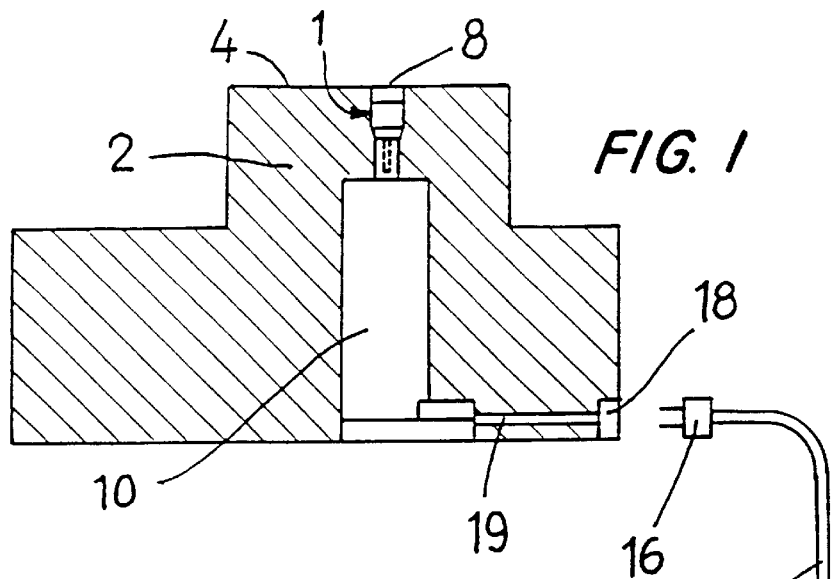
FIG. 1 is a diagrammatic view in sectioned, front elevation of the whole, formed by the marker device and the external control means.
Figure 2:
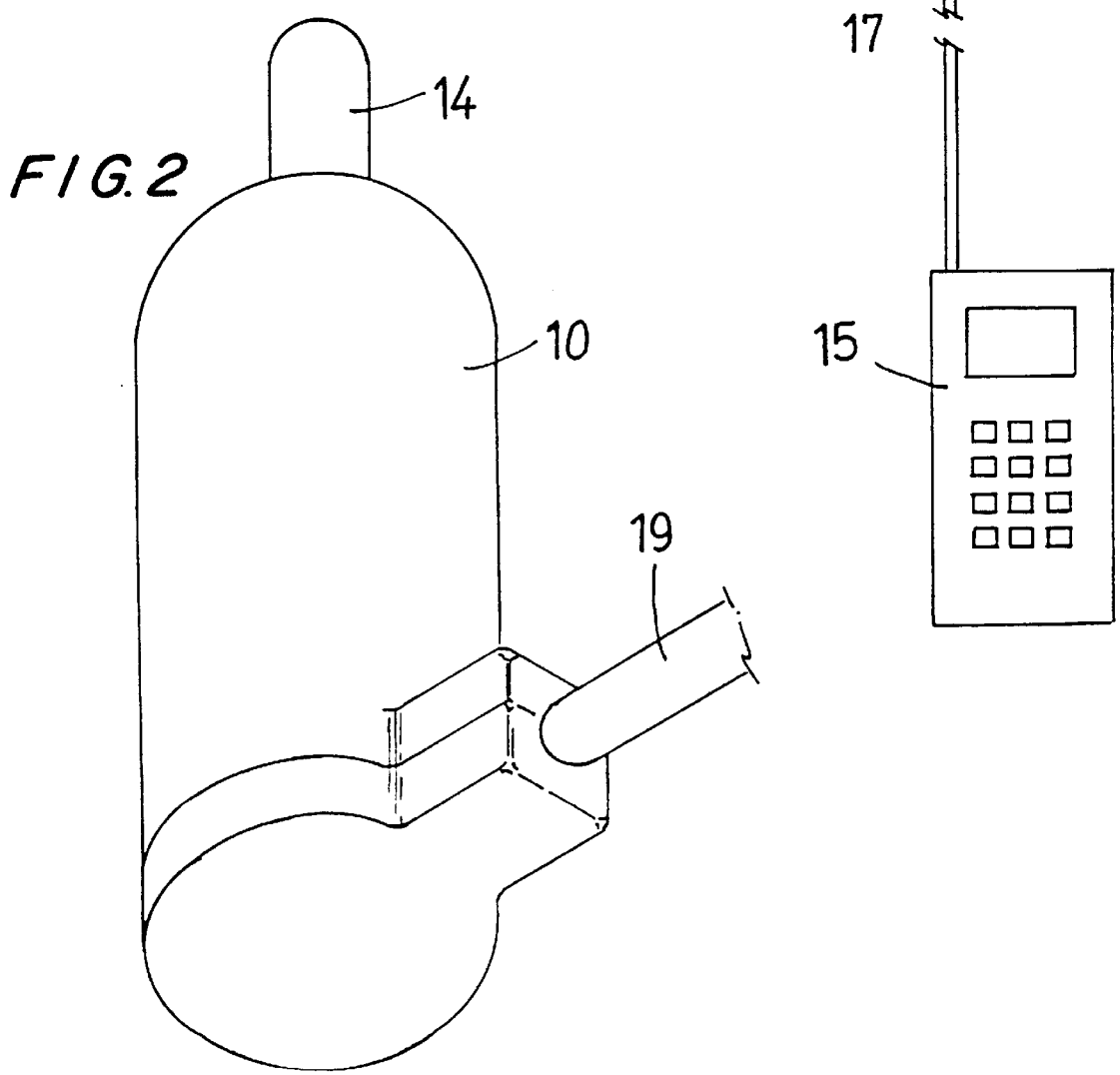
FIG. 2 shows a perspective view, in enlarged scale of the electromotor of the actuator means.

In the said drawings it can be seen that the marker device (1) referred to comprises a hollow body (11), which can be embedded in the mold (2) in the manner that its external surface (3) is flush with the internal wall (4) of the mold.

The hollow body (11) is provided with a central, cylindrical orifice (5) in whose interior a cylindrical head (6) is placed tightly which extends towards the interior of the mold (2) via an internal coaxial rod (7), that pierces the said hollow body (11) and that on its outer end also presents an external surface (8) flush with the internal wall (4) of the mold (2).

The cylindrical head (6) is able to turn on its own axis with the aim of varying its angular position in respect to the hollow body (11).

Figure 7:
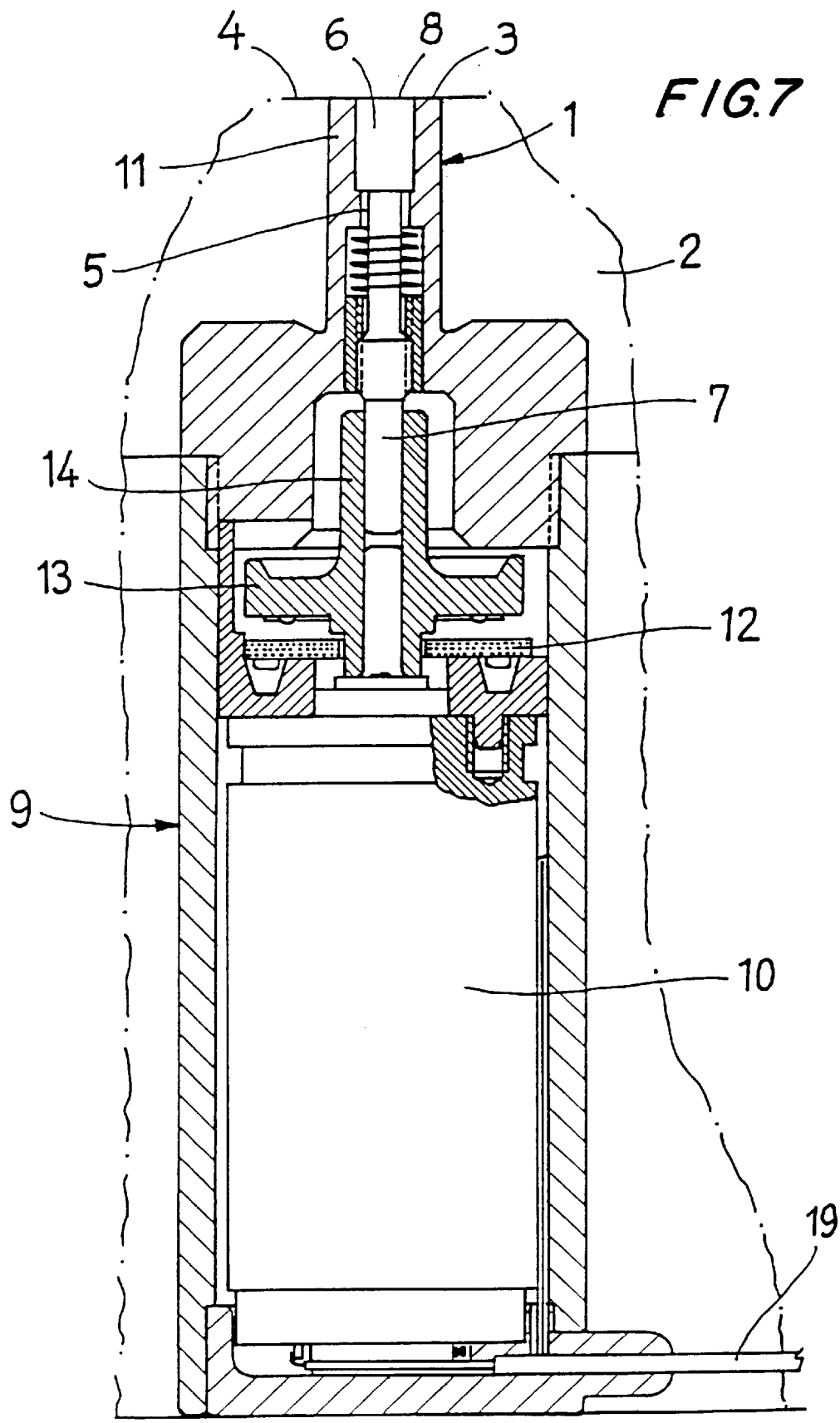
FIG. 7 is a view analogous to that of FIG. 4, of a device according to the invention in which the head and the actuator means form a single block.

The marker (1) is provided with some actuator means (9) locked into the wall of the mold (2), connected to the internal rod (7) of the head (6) and commanded from the exterior of the mold (2) by way of a control means (15). In the case represented in FIG. 7, the actuator means (9) are permanently and inseparably joined to the internal rod (7).

The said actuator means (9) are adapted to make the head (6) turn on its axis, in short turns of predetermined angular values.

To achieve the turning of the head, the actuator means comprises an electromotor (10) which, in its first embodiment, is preferably provided with a speed-reducer, not represented, and collaborates with a position detector device consisting of a printed circuit (12) fixed to the frame of the electromotor (10), and a turning connector disc (13) integral with the axle (14) of the electromotor (10).

Figure 5:
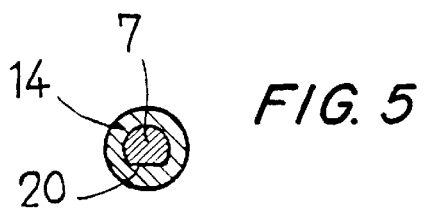
FIG. 5 illustrates a section view according to V—V of FIG. 4.
Figure 4:
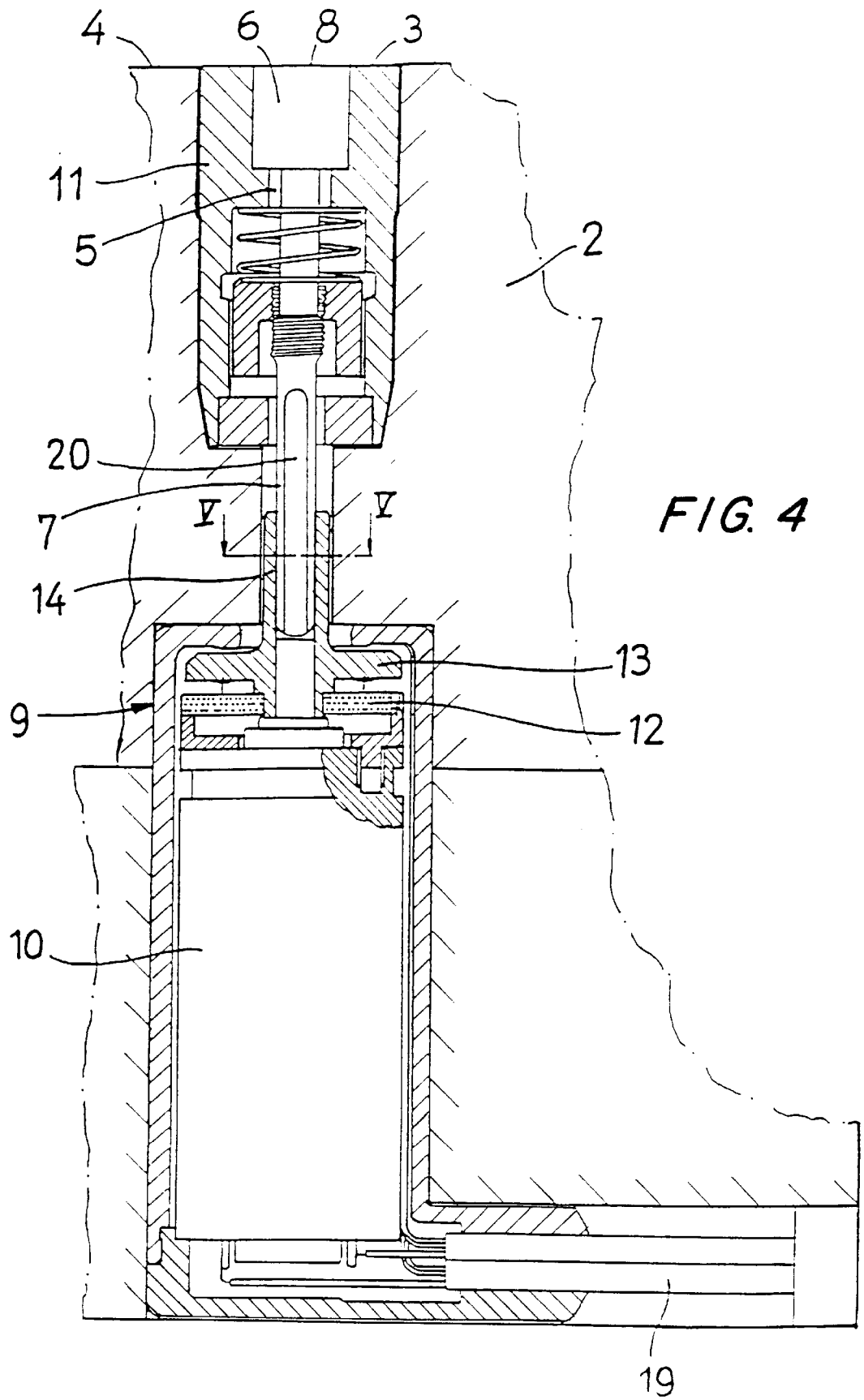
FIG. 4 is a sectioned, side elevation view of a marker device according to the invention.

The said axle (14) is hollow and is adapted to fit tightly with the internal rod (7), extension of the head (6). In FIG. 5 it can be seen that the axle (14) in its turning drags the internal rod (7), by way of a flat bevelled edge (20) with which the said rod (7) is provided and which corresponds to a flat projecting portion placed in the interior of the hollow axle orifice (14).

In a second embodiment, the electromotor (10) is of the "step by step" type, whose movement can be pre-programmed according to the turning angle of each step of the motor.

The external control means (15) is able to being plugged to the electromotor (10) circuit of the actuator means (9), by means of the connector (16) joined by the cable (17) to the control means (15) and by means of the connector (18) placed in the mold (2) and joined to the electromotor by means of the cable (19). On its turn, the said control means is preferably themselves with means for the programming of the start and stop of the electromotor (10).

With the device object of the present invention, the indicator arrow of the head (6) can be activated even with the mold (2) closed, it not being at all necessary that the external surface of the marker body is provided with any groove or cavity adapted to allow the introduction of an activating tool for the turning of the marker body, avoiding scratches in the internal wall of the mold which would reflect negatively on the final finish of the injected pieces.

Moreover, a further advantage is achieved which is that high and bas-reliefs can be eliminated, meaning that date-markers can be placed in pieces with very thin walls, such as medicinal packaging or cases.

The electromotor (10) is preferably bi-directional, which allows as much the change of month in question as the annual change or change of year, by a turn in the opposite direction, in the case that the head allows changing the marker part of the year and the arrow by a turn contrary to the advance of, for example, the months. The said reverse turn of the motor could be continuous and without stopping step by step.

Figure 6:
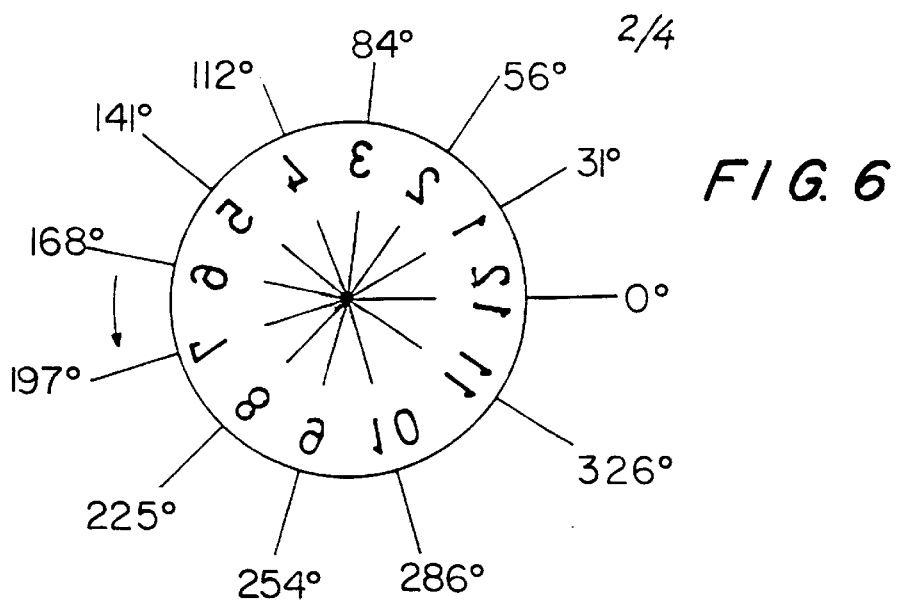
FIG. 6 shows a diagrammatic plan view of the distribution of the indicator numbers over the external surface of the hollow body of a marker device.
Figure 3:
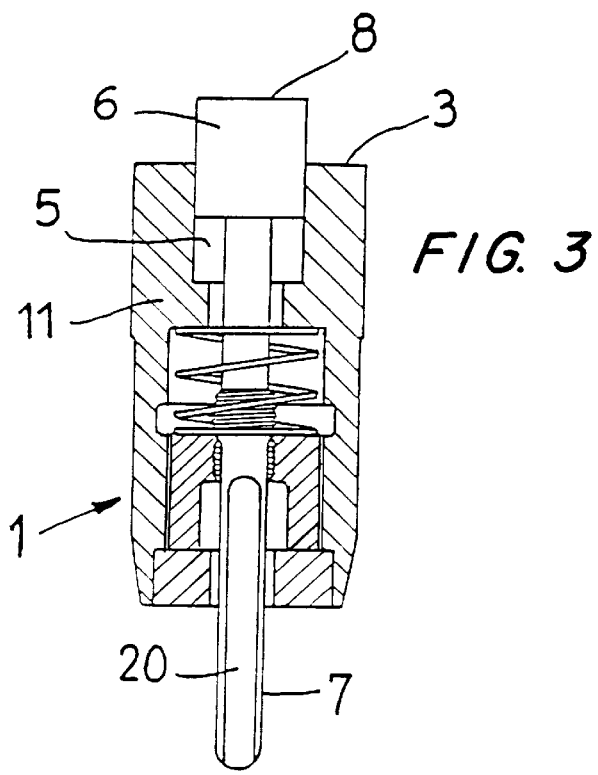
FIG. 3 illustrates a sectioned, front elevation view of a marker body of any type.

The turns of the head do not have to be equal among themselves. For example an appropriate aesthetic combination of the numbers from 1 to 12, corresponding to the months of a year, would be those that are represented in FIG. 6, in which there are the following angular separations between the numbers:

between 12 and 1: 31°
between 1 and 2: 25°
between 2 and 3: 28°
between 3 and 4: 28°
between 4 and 5: 29°
between 5 and 6: 27°
between 6 and 7: 29°
between 7 and 8: 28°
between 8 and 9: 29°
between 9 and 10: 32°
between 10 and 11: 40°; and
between 11 and 12: 34°.

Naturally this displacement of numbers in no case serves as a limiting regulation but as a mere example of embodiment.

The nature of the invention being sufficiently described, as is the manner of putting it into practice, is stated that as far as this invention is not altered, changed or modified in its fundamental principal, it may be subject to variations of detail.

In particular, the invention can be applied to marker units with the head independent of the actuator means or, on the contrary, the head and the said actuator means can constitute a single and inseparable block, without going outside the scope of the invention in any case.

I claim:

1. A marker device insertable in a plastic injection mold, the marker device comprising a hollow body lockable in the mold so that an external surface of the hollow body is flush with an internal wall of the mold, said hollow body being provided with a cylindrical central orifice; a cylindrical head which is tightly placed in said cylindrical central orifice of said hollow body and extending toward an interior of the mold via an internal coaxial rod which pierces said hollow body and has an outer end provided with an external surface which is flush with the internal wall of the mold, said head being turnable on a longitudinal axis extending through said head for varying an angular position of said head with respect to said hollow body; and actuator means embedded in the wall of the mold, connected to said internal rod of said head and commandable from outside of the mold by external control means, said actuator means turning said head on said longitudinal axis of said head in any of both rotation directions.

2. A marker device as defined in claim 1, wherein said actuator means include an electric motor, a speed-reducer and a position detector.

3. A marker device as defined in claim 2, wherein said electric motor is a stepper motor.

4. A marker device as defined in claim 1, wherein said actuator means include an electric motor, said external control means being removably connected with a circuit of said electric motor and including a source of electric energy for running said electric motor, said control means being provided with means for programming a start and a stop of said electric motor.

5. A marker device as defined in claim 1, wherein said head and said actuator means together form a single and inseperable block.

* * * * *